Dec. 23, 1947.  H. A. GEHRES  2,433,111
TWO-CYCLE GAS ENGINE
Filed June 20, 1945  2 Sheets-Sheet 1
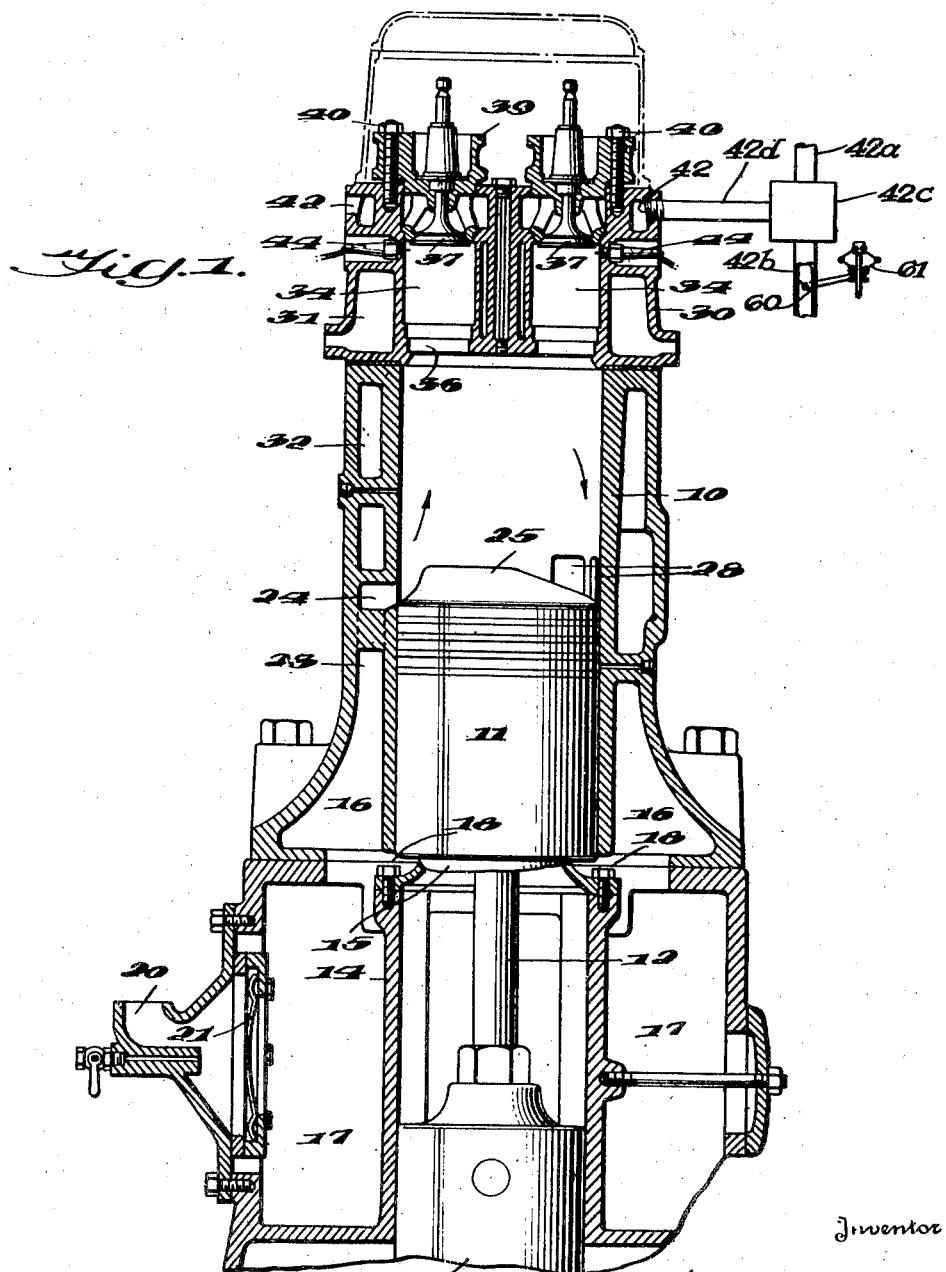

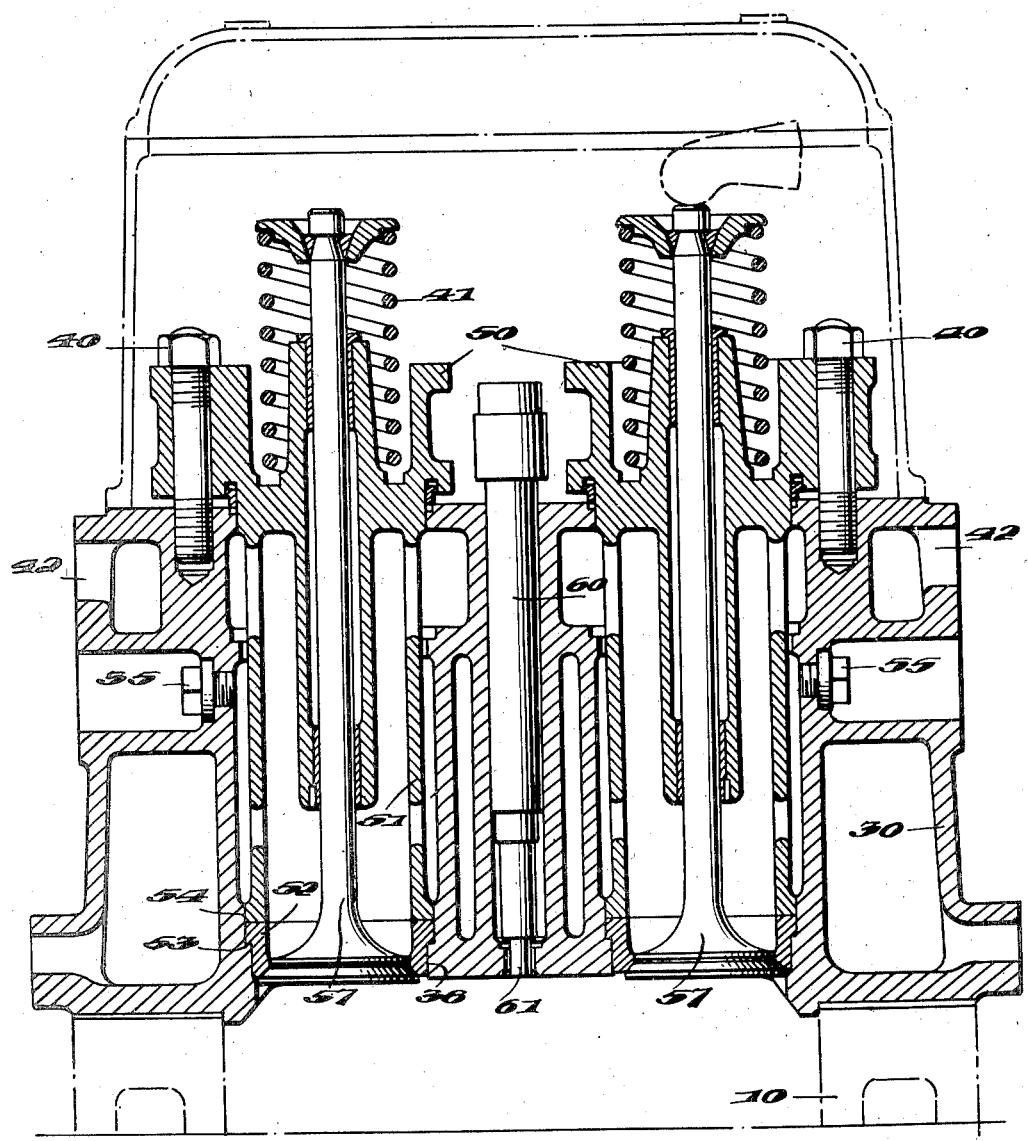

Patented Dec. 23, 1947

2,433,111

UNITED STATES PATENT OFFICE 2,433,111

TWO-CYCLE GAS ENGINE

Hewitt A. Gehres, Mount Vernon, Ohio, assignor to Cooper-Bessemer Corporation, Mount Vernon, Ohio, a corporation of Ohio Application June 20, 1945, Serial No. 600,574

3 Claims. (Cl. 123—69)

In U. S. Patent No. 2,166,930 issued to me on July 25, 1939, I have disclosed an engine of the general type with which the present invention is concerned. This patent describes an engine wherein a combustion pocket is provided at the head end of the cylinder of a two cycle engine, and the contents of the combustion pocket and main combustion space of the cylinder are stratified into three zones consisting of a combustible mixture adjacent the igniter in the combustion pocket, a stratum of air in the main combustion space, and a stratum of gaseous fuel too rich for efficient combustion by itself, this last mentioned rich fuel zone being interposed between the combustible mixture and the scavenging air which has been injected into the main combustion space.

I have now discovered that results far surpassing those obtained by engines constructed and operating in accordance with the above mentioned patent, may be obtained by eliminating the intermediate stratum above mentioned, and introducing all the fuel to be ignited into the combustion pocket space at the head end of the cylinder to form a uniform fuel and air mixture in the region of the igniter, which mixture under full load or overload conditions is substantially richer than in the prior patent, but still capable of direct ignition in the usual manner. In other words, in practicing the present invention the fuel mixture introduced into the combustion pocket in the region of the igniter will be the entire fuel charge and will be so rich as to fairly closely approach but not exceed the limit of direct ignitability when the engine is operating at full load, the intermediate layer of rich fuel of the prior patent will be omitted, and the rich but ignitable mixture will be directly subjected to the cooling action of the stratum of cooler scavenging air which is introduced into the main combustion space, thus avoiding the risk of preignition by premature rise in temperature of the rich combustible mixture. The scavenging air substantially eliminates residual hot gases which might otherwise cause preignition of the rich combustible mixture in the combustion pocket, and keeps this mixture cool enough to avoid ignition until the igniter is operated. Scavenging air will first be introduced into the cylinder near the end of the power stroke in the usual manner, then the introduction of the combustible mixture into the combustion pocket will be initiated during the latter part of the scavenging period but while the exhaust ports are still open. Thus the burned gases in the combustion pocket space are pushed out into the scavenging air stream while the exhaust ports are still open, but the combustible mixture enters the combustion pocket space late enough in the scavenging period to prevent loss of fuel by passing out through the exhaust ports along with the scavenging air. The admission of combustible mixture into the combustion space continues after the exhaust ports have closed, thus providing supercharging. Preferably a plurality of combustion pockets of the above character are employed in practicing the present invention, each receiving its own supply of combustible mixture as aforesaid, and supplied with its own igniter.

In this way it has been found possible to provide an engine which will run satisfactorily without missing all the way from zero load up to 100 brake mean effective pressure, as compared to engines operating in accordance with the prior patent wherein the upper limit was about 56 B. M. E. P. It has also been found that engines operated in accordance with the present invention may have the advantage of being supercharged in the relation of about 62 to 100 B. M. E. P.

Regulation of the engine in accordance with the load may be accomplished by varying the amount of the aforesaid rich combustible mixture which is introduced into the combustion pocket space as above described, and also by regulating the proportion of gaseous fuel entering the mixture, in such manner that at full load the mixture is slightly under or within the limit of ignitability, while at lighter loads the mixture will be much leaner although above the limit of ignitability.

In another aspect the invention deals with an engine of the above character which is so constructed that it may be readily converted by simple changes, to operate as a Diesel engine when desired; and it is also possible to readily convert the engine to operate with gas as the primary fuel, but with ignition by the injection of a small amount of liquid fuel near the end of the compression stroke. Further objects and advantages of the invention will be in part obvious and in part specifically referred to in the description hereinafter contained which, taken in conjunction with the accompanying drawings, discloses a preferred form of engine capable of operating in accordance with the invention; such disclosure however should be considered merely as illustrative of the principles of the invention in its broader aspects.

In the drawings—

Fig. 1 is a transverse central section through one cylinder of an engine constructed in accordance with the present invention and shown as equipped for operating with a gaseous fuel, and Fig. 2 is a view on an enlarged scale of the head of a cylinder shown with long valve cages in position for conversion to Diesel operation.

Referring now to Fig. 1 of the drawing, the major portions of the engine, except for the head, may be of known construction and include a cylinder 10 in which is reciprocably mounted a piston 11 connected to a rod 12 associated with a cross head 13 which is connected by a conventional connecting rod, not shown, to a crank shaft and fly wheel in the usual manner. The cylindrical guide 14 for the cross head has an end closure 15, suitably packed about the connecting rod whereby the lower face of the piston may act as an air pump in association with chambers 16 and 17 in the engine housing to which the piston rear face is connected through passages 18.

A suitable air inlet 20, controlled by an automatic flap valve 21 permits the entrance of relatively cool air into chambers 17, on the up stroke of the piston, but closes on the down stroke so that air is compressed in the several chambers and is available for delivery through passage 23 to air inlet port 24 when it is uncovered by the piston at the lower end of its expansion stroke. The air compressed in the several chambers is thus released for scavenging the products of combustion from the cylinder in a manner common to two-cycle engines. The top of the piston is provided with a baffle 25 to direct the air upwardly so that it follows the general path of the arrows in the cylinder.

The several exhaust ports 28 in the wall of the cylinder opposite the air port 24 are sized and positioned to be uncovered by the descending piston slightly prior to the uncovering of the air discharge port whereby the high pressure combustion products are released and discharged under their own expansion until approximately atmospheric pressure is reached, prior to the entrance of scavenging air. The air then, under no substantial resistance, mixes with, dilutes and blows out the products of combustion and leaves in the main cylinder chamber a quantity of substantially pure air under slight superatmospheric pressure which is then compressed during the up stroke of the piston.

The cylinder head 30 is suitably attached to the cylinder walls, is provided with a water cooling chamber 31 which in this case is shown as independent from the cylinder wall cooling chambers 32, and is preferably equipped with two or more substantially cylindrical and deep pockets 34 of the character previously described, whose axes are preferably nearly parallel to the axis of the main cylinder. Each pocket has a slightly restricted opening 36 into the cylinder and its upper or outer end is adapted to be closed by a poppet valve 37 which, as illustrated, is mounted for operation in a cage 39 received in suitable machined openings through the cylinder head and secured in position by fastening means 40. The valves may be of known construction and may be equipped, as shown in Fig. 2, with appropriate springs 41. They can be of the automatically operating type or controlled mechanically through a conventional lifter mechanism, as known in the art.

Each valve controls the in-flow of the fuel mixture from a passage 42. These passages 42 are connected to any suitable source of a permanent fuel gas and air under sufficient pressure to issue into the pockets 34 at the necessary rate when the valves are opened. This source of fuel supplies at all times an ignitable mixture which will reliably ignite by electric spark under all conditions of operation of the engine from zero to full load. This mixture will be materially richer in gas at full load than would be required if it filled the whole cylinder but its composition always remains within combustible limits. The ignition referred to is effected by appropriate spark plugs 44 introduced through the sides of the pockets 34 just below the valve heads. At the right of Fig. 1 I have shown schematically pipes 42a and 42b which supply air and gas respectively at relatively low pressure to a mixing chamber 42c from whence the mixture passes through a pipe 42d to the passage 42. Regulation of the proportion of gas in the mixture is shown schematically as effected by a butterfly valve 60 in pipe 42b, which is controlled by the centrifugal governor 61. The amount of scavenging air admitted is substantially constant at all loads.

In operation, each cylinder is exhausted near the end of the power stroke, and after the stream of scavenging air has been set up in the cylinder, the valves 37 are opened as previously described and a measured quantity of the gaseous mixture is delivered into the pockets 34 as determined by the governor or throttle means in accordance with the needs for the particular load on the engine at the time. The lower part of the cylinder is thus scavenged by air through the ports, while the pocket space is scavenged by the combustible mixture which pushes the residual products of combustion out of the pocket space into the stream of scavenging air to be exhausted therewith. In most cases the total quantity of the mixture delivered into the pockets remains therein although at high loads a noticeable quantity may overflow into the upper end of the combustion chamber. The deep shape and the position of the mouths of the pockets as well as the restricted opening of the latter, and the direction and manner of flow of the scavenging air all result in substantially complete segregation of the fuel mixture from the scavenging and combustion air, and with the combustible mixture directly adjacent the relatively cool air in the main cylinder chamber. The valves 37 are timed to admit the combustible mixture during the latter part of the scavenging period, when the ports 24 and 28 are still open, pushing the burned gases out of pockets 34 in time to be exhausted through ports 28, but late enough to avoid passage of combustible mixture out through the ports 28. As previously stated the admission of combustible mixture continues after the ports 24 and 28 have closed to provide supercharging, but the introduction of fuel may be completed during the early part of the compression stroke while the cylinder pressure is still relatively low.

When compression begins, a relatively stagnant condition exists in the cylinder and there is but little mixture of the fresh air with the rich charge in the pockets. Any fuel and air mixture which is in excess of pocket capacity stratifies near them and there is substantially no dilution of the fuel mixture by the scavenging air which passes through the ports. A certain amount of stratification may exist in each pocket with the richest mixture adjacent the igniters so that 100% ignition is effected for all sizes of charge. Upon ignition, the rich mixture burns simultaneously in both pockets and blows out therefrom into the enlarging main cylinder chamber where the additional air necessary for perfect and complete combustion is always available. The whole supplied charge, whatever its quantity, is therefore completely burned, the length of time of burning depending on the quantity of fuel charged which, in turn, is regulated according to the engine load.

Engines operating in accordance with this invention have shown marked improvement in power output, fuel consumption and reliability of ignition over engines of the same size and general type but of earlier form. The segregation of substantially the whole fuel charge in the pocket space makes possible the use of such a rich mixture at full load that the brake mean effective pressure can be boosted from around 50 lbs., which is apparently a maximum in normal two-cycle gas engines, to 100 lbs. or upwards which about doubles the power output per cylinder of the engine. Under zero load the ignition is reliable since the firing takes place where the combustible mixture is still within proper proportions for ignition in spite of its relatively reduced quantity and richness.

Reference herein to gaseous fuel should be understood as including fixed gases as well as vaporized or atomized liquid fuels.

Many gas engine installations are made where there is not always a reliable source of gas and there is a large demand for engines which are quickly convertible from gas to Diesel operation with a minimum of required mechanical changes. The engine just described is peculiarly adapted for this conversion which in this case requires only the use of a different set of valves whose cages are sufficiently long to reach to the pocket necks 36, and the insertion of a liquid fuel injector. The valves may be used to completely eliminate the pockets as enlargements of the main cylinder chamber whereby the compression pressure is immediately increased to that necessary for Diesel ignition.

Referring now to Fig. 2, wherein only the cylinder head is shown, it will be seen that this head 30 differs in no respect whatsoever from that in Fig. 1, except that the short valve cages 39 of that figure have been replaced by the long valve cages 50 secured in position by the same fastening means 40. These cages have sleeves 51 extending down to and holding in position the separate valve seats 52, seated at the shoulder 53 between the neck 36 and the slightly larger counter bore 54 in the pocket wall. The spark plug openings are closed by screw plugs 55 and the valve seats are arranged to accommodate poppet valves 57 seated by means of springs 41 and arranged for mechanical operation, if desired, by any normal means. A conventional fuel injector 60 projects centrally through the head to atomize fuel from the nozzle 61 in the manner of a normal Diesel engine. It will be seen that the valves 57 by closing off the pockets immediately reduce the cylinder clearance to a point where adequate pressure is obtained to produce a temperature sufficiently high to ignite the Diesel fuel. The valves may be maintained closed during Diesel operation or, if desired, may be used as supplementary exhaust or inlet ports.

One further use for the valves resides in the operation of a primarily gas fueled engine wherein ignition is secured by injecting a small amount of liquid fuel into the compressed charge, as disclosed in the application of Ralph L. Boyer, Serial Number 592,197 filed May 5, 1945, entitled "Two cycle engine." For this mode of operation, scavenging air alone is first admitted, and then gaseous fuel alone or mixed with air is admitted through the ports 42 under pressure sufficient to overcome the pressure existing in the cylinder during the early part of the compression stroke. The qauntity of this gas introduced is preferably sufficient to provide the major portion of the power of the engine, but the proportion of gas in the charge is held below a value which would produce spontaneous ignition at full compression. Ignition is effected by injecting a small quantity of Diesel engine oil or similar liquid fuel through the injector 60; this liquid fuel, having an ignition point lower than the temperature attained in the cylinder during full compression, ignites the charge which is thereafter capable of burning at the now increased temperature resulting from the combustion.

While the invention has been disclosed as carried out by the above described specific engine construction it should be understood that changes may be made therein without departing from the invention in its broader aspects, within the scope of the appended claims.

I claim:

1. A two cycle gas powered engine of the class described having a main cylinder chamber and a plurality of combustion pockets located at the head end of the cylinder and communicating with the main chamber, said engine including means for introducing relatively cool scavenging air into the main chamber, means for introducing into each of said combustion pockets a charge of gaseous fuel to be burned, in admixture with air to provide in each of said combustion pockets at full load a mixture of air and gaseous fuel which is so rich in gas as to be near but within the limit of ignitability by spark ignition, said engine being constructed to position the combustible mixture in said pockets directly adjacent and in substantially stratified relation to the air in the main cylinder space, a piston operating to compress the aforesaid contents of the main chamber and combustion pockets, and means for projecting sparks into each of said combustion pockets to ignite the combustible mixture contained therein.

2. A two cycle gas powered engine of the class described, having a main cylinder chamber and a plurality of combustion pockets located at the head end of the cylinder and each communicating with the main chamber, means for introducing relatively cool scavenging air into the main chamber, valve mechanisms detachably mounted in the outer portion of each of said combustion pockets, means for passing through each of said valves at full load a charge of gaseous fuel to be burned in admixture with air to provide in each of said combustion pockets a mixture of air and gaseous fuel which is so rich in gas as to be near but within the limit of ignitability by spark ignition, a piston operating to compress the contents of the main chamber and each of said combustion pockets with the charges of combustible mixture therein directly adjacent and in substantially stratified relation to the air introduced into the main cylinder chamber, and means for projecting sparks into each of said combustion pockets to ignite the charges of rich combustible mixture contained therein.

3. A two cycle primarily gas powered engine of the class described having a main cylinder chamber and also having located at the head end of the cylinder, a pocket with a gaseous fuel conducting passage leading thereto, means for introducing scavenging air into the main chamber, a valve mechanism detachably mounted in said pocket and having its valve member positioned substantially at the mouth of the pocket when the valve is closed, a piston for compressing the contents of the main chamber and means for injecting liquid fuel into said main chamber near the end of the compression stroke to ignite the fuel charge contained therein.

HEWITT A. GEHRES.

REFERENCES CITED

The following references are of record in the file of this patent:

UNITED STATES PATENTS

| Number | Name | Date |
|---|---|---|
| 1,541,207 | Burtnett | June 9, 1925 |
| 1,102,045 | Hagen | June 30, 1914 |
| 536,090 | List et al. | Mar. 19, 1895 |
| 1,140,394 | Pringle | May 25, 1915 |
| 1,528,986 | Opferkuck | Mar. 10, 1925 |
| 1,721,320 | Signorini et al. | July 16, 1929 |

FOREIGN PATENTS

| Number | Country | Date |
|---|---|---|
| 2,492 | England | 1892 |
| 15,625 | England | 1904 |